A. E. DOMAN.
AUTOMATIC CONTROLLING SYSTEM FOR ELECTRIC GENERATORS.
APPLICATION FILED JAN. 11, 1911.
1,194,970.
Patented Aug. 15, 1916.
2 SHEETS—SHEET 1.
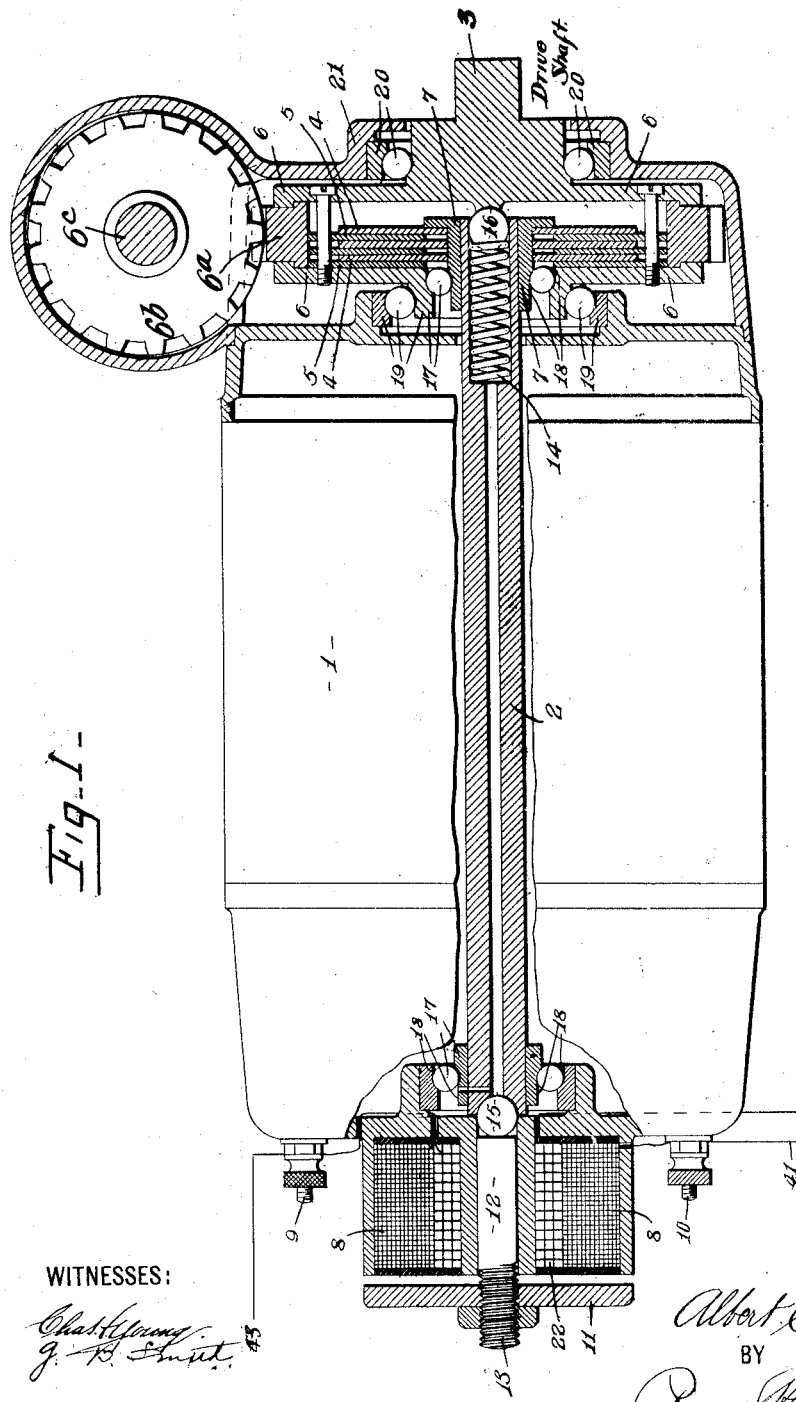
WITNESSES:
INVENTOR
Albert E. Doman
BY
Parsons Hall & Bodeel
ATTORNEYS A. E. DOMAN.
AUTOMATIC CONTROLLING SYSTEM FOR ELECTRIC GENERATORS.
APPLICATION FILED JAN. 11, 1911.
Patented Aug. 15, 1916.
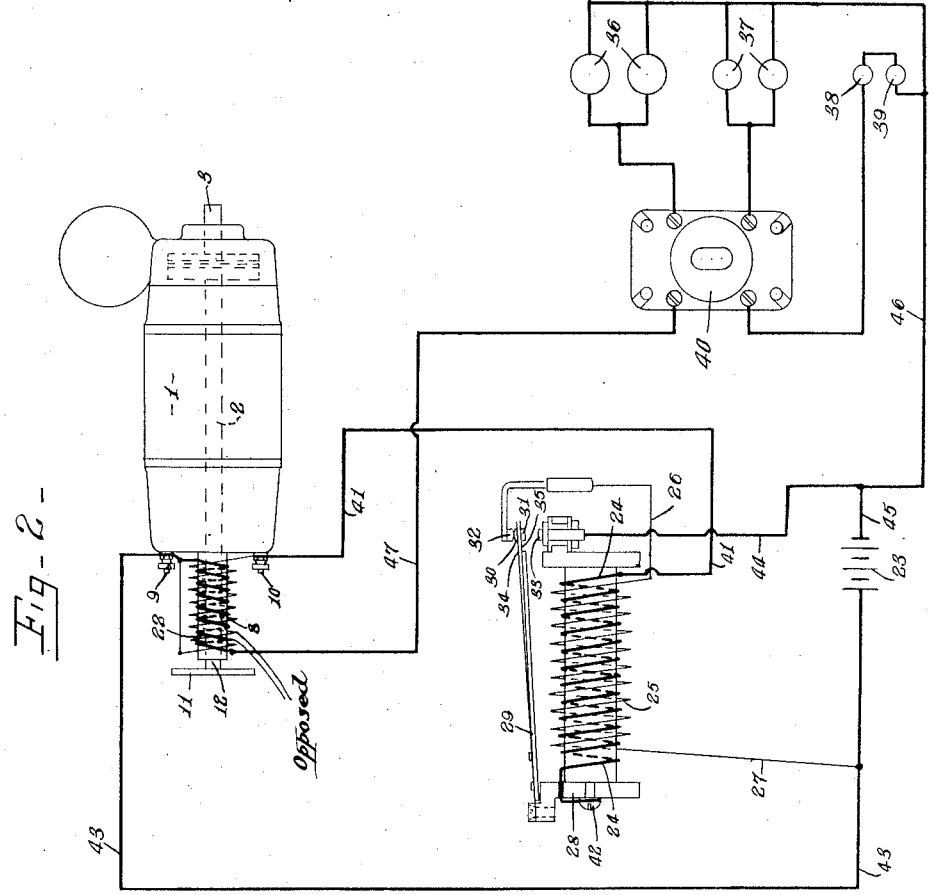
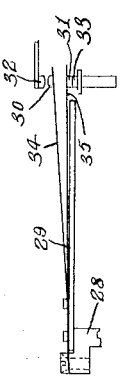
WITNESSES:
INVENTOR
Albert E. Doman
BY
Parsons Hall & Bodell
ATTORNEYS

UNITED STATES PATENT OFFICE.

ALBERT E. DOMAN, OF ELBRIDGE, NEW YORK, ASSIGNOR TO DYNETO ELECTRIC CO., OF ELBRIDGE, NEW YORK.

AUTOMATIC CONTROLLING SYSTEM FOR ELECTRIC GENERATORS.

1,194,970.  Specification of Letters Patent.  Patented Aug. 15, 1916.

Application filed January 11, 1911. Serial No. 602,089.

*To all whom it may concern:*

Be it known that I, ALBERT E. DOMAN, of Elbridge, in the county of Onondaga and State of New York, have invented a new and useful Automatic Controlling System for Electric Generators, of which the following is a specification.

My invention has for its object an automatic controlling system for electric generators and relates particularly to means for controlling an electric generator subject to widely varying speeds and also to means for maintaining a current of sufficient strength to at all times supply the requirements of the load circuit; and the invention consists in the combinations and constructions hereinafter set forth and claimed.

In describing this invention reference is had to the accompanying drawings in which like characters designate corresponding parts in all the views.

Figure 1 is an elevation, partly in section, of a dynamo provided with one embodiment of my invention, the means for controlling the speed of the rotating member of the dynamo being shown in section. Fig. 2 is a diagrammatic view of the electrical connections of my system. Fig. 3 is a detail view of the switch arm of the automatic cutout switch in the storage battery circuit.

1 designates the generator or dynamo as a whole, and the rotating member thereof in this embodiment of my invention is the armature carried by the shaft 2.

3 is the driving element for the rotating member 2, and as my invention is particularly adapted to be used in connection with automobile engines which are run at widely varying speeds, the element 3 is usually connected by suitable power-transmitting means to the crank shaft of such engine.

The means for controlling the generator and maintaining a sufficient current in the load circuit comprises, generally, variable speed connections between the driving element and the rotatable member of the dynamo, a storage battery circuit, and means operated by the current from the dynamo and by currents in the load and battery circuits for automatically operating such connections.

In the illustrated embodiment of my invention the variable speed connections are shown as frictionally engaged parts connected respectively to the armature shaft 2, and to the driving element 3, said parts being here shown as sets of disks 4, 5 of a disk clutch, one set of which is shiftable into and out of engagement with the other set.

As here illustrated the armature shaft 2 and the driving element 3 are arranged in axial alinement end to end, and the armature shaft is shiftable axially in order to shift the disks 4 thereon to more or less firmly and frictionally engage the disks carried by the driving element 3.

The disks 4 and 5 are inclosed within a suitable housing or casing 6 carried by the driving element 3 and inclosing the opposing end of the armature shaft 2, and the disks 4 are mounted on and fixed to a collar 7 on the armature shaft 2, and the disks 5 are carried by the casing 6 and interleave with the disks 4.

The casing 6 is provided with suitable power-transmitting means, as a gear $6^a$ which meshes with a gear $6^b$ mounted on a timer shaft $6^c$. As the casing 6 always rotates at the speed of the engine, the timer which is mounted on the shaft $6^c$ will always rotate at speeds having the same proportion to the speed of the engine.

The means for governing the engagement of the disks 4, 5 comprises an electromagnet including a coil 8 connected across the terminals 9 and 10 of the dynamo, and an armature 11 arranged within the magnetic field of the coil 8, and means for transmitting the movement of the armature to the collar 7 carrying the disks 4. These connections comprise a push rod 12 adjustably connected by a screw thread connection 13 to the armature 11, said rod being arranged coaxially with the armature shaft 2 and operating to force the armature shaft 2 axially in one direction against the action of a spring 14 interposed between the opposing ends of the armature shaft 2, and the driving element 3, this spring serving to normally hold the disks 4, 5 in engagement with each other. Antifriction members as balls 15 and 16 are usually interposed respectively between the abutting ends of the rod 12 and the armature shaft 2, and the spring 14 and opposing surface of the driving element 3, and also the armature shaft 2 is journaled in ball bearings 17 located respectively at one end of the case of the dynamo and within the casing 6, raceways as 18, of such bearings being comparatively wide for facilitating the axial shifting of the shaft 2 with minimum friction. The driving element and casing 6 are also journaled in antifriction bearings 19, 20 supported respectively by the casing of the dynamo, and a casing 21 fixed to the casing of the dynamo. The electromagnetic means also preferably includes another coil 22 within the coil 8 and differentially wound with respect to the coil 8, the coil 22 being of coarse wire and being connected in series with the load circuit which is connected to the terminals 9, 10 of the dynamo.

The means for maintaining a sufficient current to supply the requirements in the load circuit irrespective of the dynamo, (that is, when the driving element 3 is running too slowly to actuate the armature shaft fast enough to generate a current), comprises a storage battery 23 connected in circuit with the terminals 9, 10 of the dynamo and with the load circuit, and usually an automatic cutout switch is interposed between the dynamo and the storage battery in order to prevent the battery from discharging back into the dynamo in case the dynamo is running slowly and is of lower voltage than the battery.

The cutout switch comprises an electromagnet having a coil 24 of coarse wire connected in series with the battery 23 and the terminal 10 of the dynamo, a coil 25 of fine wire connected in circuit with the first-mentioned coil and in shunt from one side of the dynamo 1 to the other side thereof, by wires 26 and 27, the coils being wound upon a suitable frame 28 which serves as a core. The wires 26, 27 are connected respectively to the terminals of the dynamo by wires hereinafter referred to.

The armature 29 is connected in both main and shunt circuits by the frame and is provided with contact points 30, 31 movable between contact terminals 32, 33 located respectively, in the shunt circuit in which the coil 25 is arranged and in the storage battery circuit, the switch arm being normally arranged so that its contact point 30 is engaging with the contact terminal 32 of the shunt circuit when the battery is charged or when the voltage of the battery is above that of the dynamo. When the voltage of the battery falls below that of the dynamo and the coils 24 and 25 create sufficient magnetic force to attract the armature 29, the contact point 31 engages with the contact point 33 and the current from the dynamo will flow into the battery.

The contact points 30 and 31 of the switch arm are usually carried at corresponding ends of leaf springs 34, 35 arranged one upon the other and fixed at their opposite ends to one end of the armature block 29 so that when the armature is attracted the spring 35 will carry the contact point 31 into engagement with the contact terminal 33 before the contact point 30 on the spring 34 breaks contact with the terminal 32.

The leaf springs 34, 35 act as a delayed break switch, and after the contact 31 engages at 33 the armature is additionally actuated Fig. 3, flexing the spring 35 and pulling the spring 34 away from the contact 32. The specific construction and operation of this switch is known to those skilled in the art and forms no part of this invention. Owing to the arrangement of the coils 24 and 25 and the armature switch 29 and its contact points, a current of sufficient strength must be generated by the dynamo to cause these coils to create a sufficient magnetic field about the frame 28, which serves as a core, to attract the armature switch 29 so that its contact 30 breaks with the contact 32 and its contact 31 engages the contact 33, thus causing the armature switch 29 to switch the current, generated by the dynamo, into the storage battery 23, the magnetic field created by the inner coil 24 being sufficient to hold the armature engaged with the contact 33, and the coil 25 being in shunt with the opposite sides of the dynamo circuit and serving as a starter to energize the coil 24. If the speed of the engine driving the dynamo and hence the speed of the dynamo falls below a certain point, the magnetic field created by the coil 24 of course weakens and the armature switch will move in contact with the point 32 and out of contact with the point 33, thus cutting out the battery. Hence the battery cannot discharge back into the dynamo when the dynamo stops or runs slowly as when the engine runs slowly, as it would if this automatic cut-out switch were not provided.

In the illustrated embodiment of my invention the load circuit is shown as connected to branch circuits of an automobile lighting circuit containing head lights 36, side lights 37, a tail light 38 and a meter light 39 connected in series with the tail light. The closing of the circuits to these lights is controlled by a suitable switch 40 constructed so that combinations of lights may be connected in circuit leaving others out of the circuit or so that all the lamps can be connected in the circuit. For instance, the switch can be operated to light both head lights, or both side lights or the tail light and meter light, or all of such lights may be on at once. Consequently, the current required by the load circuit varies.

The operation of the apparatus is as follows: When the dynamo is first started the electromagnetic windings 8 and 22 are inoperative as there is no current flowing through them, consequently, the spring 14 exerts its entire strength to compress the disks 4, 5 of the clutch together so that the armature shaft 2 is driven at the same speed as the driving member 3. As soon as the dynamo begins to generate, the current will energize the winding 8 and the armature 11 is attracted moving the shaft 2 endwise to the right, Fig. 1, and decreasing the frictional engagement of the disks 4 and 5 more or less according to the strength of the magnetic action of the coil 8, and thus the disks 4, 5 of the clutch will slip so that the shaft 2 will run slower than the driving member 3. As soon as the E. M. F. drops and the magnetic action of the coil 8 weakens, the spring again presses the shaft 2 to the left so that the disks are more firmly engaged and the armature shaft runs at a higher rate of speed depending on the increase in friction between the disks 4, 5. The balance of the spring 14 and the magnet 8 is effected by adjusting the armature on the threaded end 13 of the rod 12. When sufficient current is generated by the dynamo it passes from the terminal 10 to the wire 41, coil 24 of the cutout switch, screw 42, frame 28, armature 29 to the contact points 30 and 32, conductor 26 of the shunt circuit, coil 25 of fine wire and wire 27 and to the terminal 9 of the dynamo through wire 43. The current in passing through coils 24 and 25 when of sufficient strength, creates enough magnetic action to attract the armature until the contact point 31 engages the contact terminal 33, the contact point 30 in the meantime breaking contact with the contact 32, and the current then passes from the terminal 10 of the dynamo, wire 41, series coil 24, frame 28, armature 29, contact points 31 and 33, conductors 44 and 45 through the battery 23 and to the terminal 9 of the dynamo through the wire 43. In case the switch 40 is on some of such current passes in the conductor 46 of the load circuit, through the lights and to the terminal 9 of the dynamo through the conductor 47 and winding 22. The coil 8 being connected across the generator terminals tends to keep the voltage of the generator constant under all conditions of generator speed and battery state of charge. If the battery becomes charged its rise of counter-emf. cuts down the current to a small amount. If the lamp load is small and the battery nearly charged the current in series coil 24 may become so low that the automatic switch opens. On the opening of the switch, however, the coil 25 becomes energized causing the switch to immediately close again and under these conditions the switch will have a vibratory action. If the switch 40 is operated to connect one or more sets of lights in the load circuit and the dynamo is running too slow to generate sufficient current, the current will flow from the battery 23, wires 45, 46 to the lights and switch 40, wire 47, coarse wire winding 22, terminal 9 and wire 43 to the battery 23, and as the coarse wire winding 22 is differentially wound with respect to the coil 8, the magnetic action of the coil 8 is retarded when the switch 40 is on, that is when the load circuit is closed, and thus the disks 4, 5 will not be separated as readily as when the load circuit is open. Thus the engagement of the disks is automatically controlled by the work the dynamo is required to do.

In use the apparatus will generate as much or as little current as needed, the operation of the controlling magnet 8 being of course retarded by the windings 22 of the load circuit.

What I claim is:

1. The combination of an electric generator including an armature shaft, a driving element, a friction clutch interposed between the driving element and the shaft, the clutch including a shiftable part, and governing means for controlling the operation of the friction including an electromagnetic coil connected across the terminals of the generator, an armature arranged to be acted upon by the field of said coil, means for transmitting the movement of the armature to the shiftable member of the clutch, a second electromagnetic coil arranged to act in opposition to the first coil, a storage battery and a load circuit adapted to be supplied by said generator, the load circuit being connected to the terminals of the generator through said second mentioned coil, and the storage battery being connected to the terminals of the generator independent of said coil, and an automatic cut out switch in the storage battery circuit.

2. The combination with a generator comprising an armature shaft shiftable axially, a driving element arranged coaxially with one end of the shaft, a friction clutch interposed between the driving element and the shaft and arranged coaxially with the shaft, the clutch comprising a part carried by the shaft and shiftable axially therewith, electromagnetic means at the other end of the shaft and coacting with the contiguous end thereof and including a coil connected in the circuit with the generator and an armature, and a rod connected to the armature and arranged coaxially with the shaft, substantially as and for the purpose described.

3. The combination with a dynamo including an axially shiftable armature shaft, a driving element arranged coaxially with the shaft and opposed to one end thereof, and comprising a hollow casing rotatable with the driving element and inclosing the opposing end of the shaft, a friction clutch interposed between the driving element and the shaft and including a set of disks carried by and rotatable with the casing, and a series of disks carried by and rotatable with the shaft and movable axially therewith, the latter disks interleaving with the first-mentioned disks, a spring arranged axially with the shaft and interposed between said shaft and the opposing end of the driving element, electromagnetic means including a coil connected in circuit with the dynamo and an armature, and connections between the armature and the shaft whereby the movement of the armature is transmitted to the shaft, substantially as and for the purpose set forth.

In testimony whereof, I have hereunto signed my name in the presence of two attesting witnesses, at Syracuse, in the county of Onondaga, and State of New York, this 10th day of December, 1910.

ALBERT E. DOMAN.

Witnesses:
W. B. SWEET,
A. E. BROWN.

Copies of this patent may be obtained for five cents each, by addressing the "Commissioner of Patents, Washington, D. C."